United States Patent
Li et al.

(10) Patent No.: US 10,041,010 B2
(45) Date of Patent: Aug. 7, 2018

(54) PROCESS AND DEVICE FOR TREATING CATALYST DISCHARGED FROM BUBBLING BED HYDROGENATION OF RESIDUAL OIL

(75) Inventors: Jianping Li, Shanghai (CN); Jiangang Wang, Shanghai (CN); Hualin Wang, Shanghai (CN); Yanhong Zhang, Shanghai (CN); Xin Cui, Shanghai (CN); Ling Shen, Shanghai (CN); Liquan Li, Shanghai (CN); Chonggang Chen, Shanghai (CN); Qian Zeng, Shanghai (CN); Ying Zhao, Shanghai (CN)

(73) Assignee: Shanghai Huachang Environmental Protection Co., Ltd., Shanghai (CN)

(*) Notice: Subject to any disclaimer, the term of this patent is extended or adjusted under 35 U.S.C. 154(b) by 789 days.

(21) Appl. No.: 14/398,059

(22) PCT Filed: Jul. 25, 2012

(86) PCT No.: PCT/CN2012/079132
§ 371 (c)(1),
(2), (4) Date: Mar. 26, 2015

(87) PCT Pub. No.: WO2013/166783
PCT Pub. Date: Nov. 14, 2013

(65) Prior Publication Data
US 2015/0218463 A1      Aug. 6, 2015

(30) Foreign Application Priority Data

May 11, 2012   (CN) .......................... 2012 1 0147625

(51) Int. Cl.
C10G 53/02 (2006.01)
C10G 47/26 (2006.01)
(Continued)

(52) U.S. Cl.
CPC .............. *C10G 53/02* (2013.01); *B01J 23/90* (2013.01); *B01J 38/48* (2013.01); *C10G 47/26* (2013.01);
(Continued)

(58) Field of Classification Search
CPC ........ C10G 53/02; C10G 47/26; C10G 49/12; C10G 53/04; C10G 2300/70;
(Continued)

(56) References Cited

U.S. PATENT DOCUMENTS 4,661,265 A    4/1987  Olson et al.
5,053,082 A *  10/1991 Flanigan ............ B01D 11/0223
                                                  210/512.1

FOREIGN PATENT DOCUMENTS

CN     1057411 A    1/1992
CN     1752021 A    3/2006
(Continued)

OTHER PUBLICATIONS

Translation of the Written Opinion for PCT/CN2012/079132, dated Feb. 14, 2013.*

(Continued)

*Primary Examiner* — David A Reifsnyder
(74) *Attorney, Agent, or Firm* — Greenberg Traurig, LLP; Fang Xie

(57) ABSTRACT

The invention relates to a process and a device for treating a catalyst discharged from bubbling bed hydrogenation of residual oil. Provided is a process for treating a catalyst discharged from bubbling bed hydrogenation of residual oil, comprising the following steps: (1) adjustment and control to reduce viscosity; (2) desorption and separation by rotational flow; and (3) separation and resource utilization of an (Continued)

oil-water-catalyst three phase. Also provided is a device for treating a catalyst discharged from bubbling bed hydrogenation of residual oil.

12 Claims, 1 Drawing Sheet

(51) Int. Cl.
    *C10G 49/12*     (2006.01)
    *C10G 53/04*     (2006.01)
    *B01J 23/90*     (2006.01)
    *B01J 38/48*     (2006.01)

(52) U.S. Cl.
    CPC .............. *C10G 49/12* (2013.01); *C10G 53/04* (2013.01); *C10G 2300/107* (2013.01); *C10G 2300/1077* (2013.01); *C10G 2300/4081* (2013.01); *C10G 2300/70* (2013.01)

(58) Field of Classification Search
    CPC .... C10G 2300/4081; C10G 2300/1077; C10G 2300/107; B01J 23/90; B01J 38/48
    See application file for complete search history.

(56) References Cited

FOREIGN PATENT DOCUMENTS

| | | |
|---|---|---|
| CN | 101219396 A | 7/2008 |
| CN | 101380597 A | 3/2009 |
| CN | 201978749 U | 9/2011 |
| CN | 102698815 A | 10/2012 |

OTHER PUBLICATIONS

International Search Report for International Application No. PCT/CN2012/079132 dated Feb. 14, 2013.

* cited by examiner

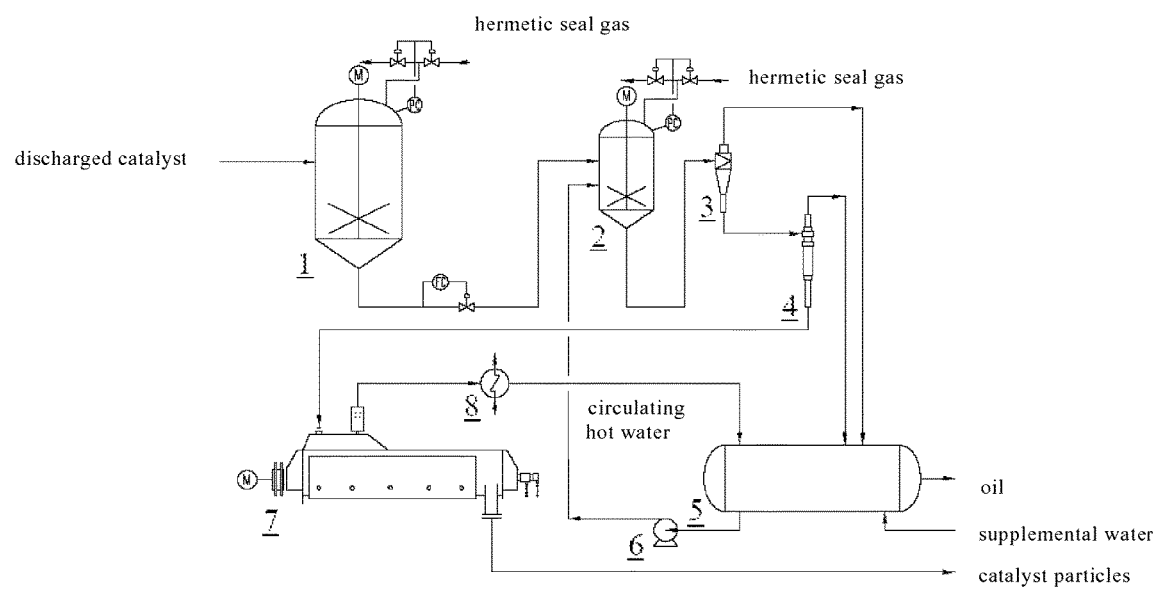

PROCESS AND DEVICE FOR TREATING CATALYST DISCHARGED FROM BUBBLING BED HYDROGENATION OF RESIDUAL OIL

CROSS-REFERENCE TO RELATED APPLICATIONS

This application is a national phase application under 35 U.S.C. 371 of International Application No. PCT/CN2012/079132 filed Jul. 25, 2012, which claims priority to and the benefit of Chinese Application No. 201210147625.1 filed May 11, 2012, both of which applications are hereby incorporated by reference in their entirety.

TECHNICAL FIELD

The invention pertains to the field of petrochemical chemical engineering and environmental protection, and relates to a process and a device for treating oil-containing porous particles in order to fulfill the object of recovering the oil and the solid particles respectively from the oil-containing porous particles. In particular, the invention provides a process and a device for treating a catalyst discharged from bubbling bed hydrogenation of residual oil.

BACKGROUND ART

The bubbling bed hydrogenation technology for residual oil is an important technology for processing heavy oil with high contents of sulfur, residual carbon and metals, and has apparent advantages in solving the problems of fixed bed hydrogenation of residual oil, such as low space velocity, rapid deactivation of the catalyst, large pressure drop of the system, inclination of coking, short operation cycle of the device, etc.

For ensuring long-term operation of a bubbling bed residual oil hydrogenation device for 3-5 years, the STRONG technology for bubbling bed hydrogenation of residual oil realizes on-line charge and discharge of a catalyst. When a deactivated catalyst is discharged from a reactor, a large quantity of petroleum type pollutants (alkanes, aromatics, gums, bitumen, etc) are adsorbed on the surfaces and inside the pores of the discharged catalyst particles, which petroleum type pollutants, once put into the environment, may be extremely harmful to human bodies, animals, plants, and the air and water environment. Hence, a good number of strict regulations aiming at environmental protection have been made against catalyst discharge. The US Environmental Protection Agency (EPA) has put waste catalysts (including waste catalysts discharged from hydrogenation treatment, hydrogenation refining, hydrogenation cracking) into the list of dangerous discards. In 2008, the Ministry of Environmental Protection of PRC listed waste catalysts in the National Catalog of Hazardous Waste, and labeled their hazardous property as Grade T (toxic). On the other hand, the oil content of a discharged catalyst is usually up to 20-60%. Unreasonable treatment thereof means tremendous waste of petroleum resource.

Up to now, discharged catalysts are treated in the industrial field mainly in two ways: landfill and incineration. However, landfill may waste a lot of land resource, and cause pollution to the soil environment and the water environment. In the treatment by incineration, the heat energy in the petroleum type pollutants is not utilized effectively. In addition, because a large amount of sulfur and heavy metal components, among others, are usually adsorbed in the discharged catalysts, these components may be carried by tail gas into the air environment during incineration or calcination, forming a secondary pollution source.

Chinese Patent Application CN 1557977A disclosed a process for recovering oil by condensing a dry distillation gas which was obtained in continuous dry distillation of a discharged catalyst at 400-800° C. for 1-2.5 hours. However, the process as a whole suffered from the problems of long flow and high energy consumption. Chinese Patent Application CN 101166837A disclosed a process of stirring and scrubbing a discharged catalyst using a dense phase gas having a pressure up to 60 bars. However, there existed the problems of complex device operation, large device investment, and poor maneuverability. U.S. Pat. No. 4,661,265 disclosed a process for separating oil from a catalyst discharged from a reactor, comprising: decreasing the temperature of the discharged catalyst to the flash point of the oil using an oil cooling method; and then exporting the discharged catalyst from a storage tank using a screw conveyor, wherein the oil leaked down from the screw slit under gravity during the exporting, such that separation of oil from the discharged catalyst was realized. However, the deoiling efficiency was not high, and the discharged catalyst still contained a lot of oil after treatment.

To sum up, in general, current treatment of a discharged catalyst cannot achieve ideal effect due to insufficient deoiling efficiency, or unduly high consumption of energy for treatment, or even generation of secondary pollution. The development of hydrogenation process is affected seriously by the environmental and resource problems resulting from unreasonable treatment of discharged catalysts. In order to remove the troubles that affect the development of the bubbling bed hydrogenation process for residual oil, the issue about the treatment of a catalyst discharged from bubbling bed hydrogenation of residual oil has to be addressed. Hence, the top priority at present is development of a process and a device capable of treating a catalyst discharged from bubbling bed hydrogenation of residual oil in an effective way.

In 1993, thermal desorption was adopted by the US Environmental Protection Agency (EPA) to treat oil-containing solid waste (petroleum sludge), wherein the waste was washed repeatedly using a hot alkaline aqueous solution, followed by air floatation to carry out solid-liquid separation. Generally, the washing temperature was controlled at 70° C., the liquid/solid ratio was 3:1, and the washing time was 20 minutes. Oil field sludge containing 30% oil could be washed to contain less than 1% residual oil. In 1999, Michael J. Mann (Full-scale and Pilot-scale Soil Washing [J]. Journal of Hazardous Materials, 1999, 66:119-136) treated oil polluted soil by washing with hot water, and constructed a model device for washing soil. In the specific operation, the polluted soil particles were subjected to particle size classification using a hydraulic cyclone, and the classified polluted soil particles were washed under agitation in an agitator. As good effect was achieved, hot water washing became a relatively effective method for treating oil-containing solid waste. German Patent DE 4232455 (A1) also involved hydraulic classification of polluted soil with a hydraulic cyclone, wherein the polluted soil particles after classification were washed in a jet mixer, and the washing medium might include hot water, steam and water containing a chemical additive. However, the above processes are all directed to natural sand or clay particles as the subject of treatment, which have pore volume and specific surface area much smaller than those of an artificial catalyst support. Hu Xiaofang, et al (Relationship between Air Permeability of Soil, Specific Surface Area of Clay Particles and Fractal Dimensions of Particle Size Distribution of Clay Particles [J]. Chinese Journal of Soil Science, 2007, 38(2): 215-219) measured the specific surface area of the clay particles in the soil in South China, indicating that the BET specific surface area of the clay particles in the common soil was 39-151 m²/kg. In contrast, we can see that, if taking the catalyst support used in a bubbling bed hydrogenation process for residual oil as an example, the BET specific surface area is up to 286109.4 m²/kg. Such a large specific surface area of the catalyst particles in comparison with the clay particles suggests that the amount of the petroleum type pollutants adsorbed by the corresponding particles is much higher, and the separation by desorption is more difficult. It's difficult to treat the oil-containing porous particles of a catalyst discharged from bubbling bed hydrogenation of residual oil and having large pore volume and specific surface area using the conventional hot water washing process. Moreover, this process has a series of problems, such as complex flow, large area occupied by devices, large investment for devices, and long cycle of process operation.

Therefore, there exists an urgent need in the art for development of a process and a device for treating a catalyst discharged from bubbling bed hydrogenation of residual oil in order to solve the problems concerning the catalyst discharged from the bubbling bed hydrogenation of residual oil in a better way and fulfill the object of recovering oil from the discharged catalyst.

SUMMARY

The invention provides a novel process and a novel device for treating a catalyst discharged from bubbling bed hydrogenation of residual oil, such that the problems existing in the prior art have been solved.

The technical problem to be solved by the invention is to provide a process for treating a catalyst discharged from bubbling bed hydrogenation of residual oil in order to solve the problems in existing processes for treating a discharged catalyst, such as high treatment cost, complex process, low oil recovery, tendency of generating secondary pollution sources, etc., wherein the process according to the invention has a simple flow and is easy to carry out, eliminating the concerns in large-scale application of the bubbling bed hydrogenation technology for residual oil.

Another technical problem to be solved by the invention is to provide a device for treating a catalyst discharged from bubbling bed hydrogenation of residual oil.

In one aspect, the invention provides a process for treating a catalyst discharged from bubbling bed hydrogenation of residual oil, comprising the following steps:

(1) adjustment and control to reduce the viscosity, wherein the catalyst discharged intermittently from a bubbling bed hydrogenation reactor for the residual oil is adjusted for storage and then discharged continuously, subjected to temperature adjustment by adding water, such that the viscosity of the oil adsorbed on the surfaces and inside the pores of the discharged catalyst particles is reduced, and the flowability of the adsorbed oil on the surfaces and inside the pores of the discharged catalyst particles is improved;

(2) desorption and separation by rotational flow, wherein the adsorbed oil is desorbed and separated from the surfaces and inner pores of the discharged catalyst particles by a flowing shear force in a rotational flow field; and (3) separation and resource utilization of the three phase oil-water-catalyst, wherein the oil/water/catalyst mixture produced from the desorption and separation by rotational flow is subjected to three-phase separation, achieving recovery of the oil, recycling of the water obtained by separation, and full recovery of the solid particles obtained by separation.

In a preferred embodiment, in step (3), the oil/water mixture produced from the desorption and separation by rotational flow is subjected to oil-water separation to achieve the recovery of the oil; the water obtained by separation is recycled; and the catalyst particles/water mixture produced from the desorption and separation by rotational flow is subjected to two-stage dewatering in reducing amount by concentration and drying to achieve the recovery of the catalyst particles, wherein the water obtained by dewatering in reducing amount is also recycled.

In another preferred embodiment, the catalyst discharged from the bubbling bed hydrogenation of residual oil has an oil content of 20-60 wt % based on the weight of the catalyst; and the fresh support has a specific surface area of 183.071-416.308 m²/g determined using BJH method (a method for measuring specific surface area) and a pore volume of 0.22-0.71 ml/g.

In another aspect, the invention provides a device for treating a catalyst discharged from bubbling bed hydrogenation of residual oil, comprising:

a stirring and adjusting tank for adjusting and storing the catalyst discharged intermittently from the bubbling bed hydrogenation of residual oil, and controlling continuous effluence of the material to guarantee continuous treatment of the discharged catalyst;

a stirring and dispersing tank connected to the outlet of the stirring and adjusting tank for adjusting the temperature of the discharged catalyst by adding water to reduce the viscosity of the oil adsorbed on the surfaces and inside the pores of the discharged catalyst particles and improve the flowability of the adsorbed oil on the surfaces and inside the pores of the discharged catalyst particles;

a rotational flow desorber connected to the outlet of the stirring and dispersing tank for forming a rotational flow field therein with the discharged catalyst/water mixture, wherein the adsorbed oil is desorbed and separated by rotational flow from the surfaces and inner pores of the discharged catalyst particles with the aid of a flowing shear force in the rotational flow field;

a circulating hot water storage tank connected to the oil/water mixture outlet of the rotational flow desorber for effecting oil-water separation;

a circulating hot water pump connected to the outlet of the circulating hot water storage tank for pumping the circulating hot water into the stirring and dispersing tank for circulating use;

a rotational flow concentrator connected to the catalyst particle enriched phase outlet of the rotational flow desorber for dewatering the catalyst/water mixture by concentration after desorption and separation by rotational flow; and a dryer connected to the catalyst particle enriched phase outlet of the rotational flow concentrator for dewatering the catalyst/water mixture finally by drying to achieve the recovery of the solid catalyst particles.

In a preferred embodiment, the ratio by weight of the discharged catalyst to the circulating water in the stirring and dispersing tank is 1:5 to 1:100; and the stirring and dispersing tank has an operating temperature of 50-190° C., an operating gauge pressure of 0-1.3 MPa and a dispersing time of 1-120 minutes.

In another preferred embodiment, in the rotational flow desorber, the shear rate is 3000-10000 s$^{-1}$; the operating pressure is not greater than 0.15 MPa; the separating efficiency of the catalyst particles is not lower than 98%; the flow rate at the catalyst particle enriched phase outlet is 5-25% of that at the inlet; the oil content of the discharged catalyst after the desorption and separation by rotational flow is reduced to below 13.5 wt % after drying based on the weight of the discharged catalyst.

In another preferred embodiment, the separating efficiency of the catalyst particles by the rotational flow concentrator is not lower than 98%, and the operating pressure is not greater than 0.15 MPa.

In another preferred embodiment, the rotational flow concentrator is selected from a hydraulic cyclone; the circulating hot water storage tank is selected from an oil-water separating device; the circulating hot water pump is selected from a chemical engineering process pump; and the dryer is selected from an inner backfeed dryer.

In another preferred embodiment, the stirring and adjusting tank adopts a stirring structure to prevent sedimentation and hardening due to longtime storage of the discharged catalyst; and the stirring and dispersing tank is selected from a stirring and dispersing device to ensure homogeneous temperature control over the system by means of stirring and dispersion.

In still another aspect, the invention relates to the use of the above device for treating a catalyst discharged from bubbling bed hydrogenation of residual oil in the treatment of oil-containing solid waste.

BRIEF DESCRIPTION OF THE DRAWINGS

FIG. 1 is a flow chart of treating a catalyst discharged from a bubbling bed for residual oil according to one embodiment of the invention.

DETAILED DESCRIPTION OF THE INVENTION

After extensive and intensive study, the inventors of the present invention have found that, in the treatment of a catalyst discharged from a bubbling bed hydrogenation process for residual oil, improved flowability of the adsorbed oil on the surfaces and inside the pores of the discharged catalyst particles as a result of control over the temperature of the system by adding water creates beneficial conditions for desorption and separation of the adsorbed oil; further, the process of desorption and separation of the adsorbed oil is strengthened by a flowing shear force in a rotational flow field; after separation of the oil/water/solid three-phase mixture in the desorption and separation process, recovery of the oil, recycling of the water and recovery of the solid catalyst particles are realized. As such, the problem of treating a catalyst discharged from bubbling bed hydrogenation of residual oil is well addressed, and the object of recovering oil from the discharged catalyst is achieved; and, the process according to the invention is of great significance for large-scale promotion of the bubbling bed hydrogenation process for residual oil, particularly suitable for treating the catalyst which is discharged from the bubbling bed hydrogenation process for residual oil and has a large pore volume and a large specific surface area. The present invention has thus been accomplished on the basis of the foregoing findings.

In one aspect of the invention, there is provided a process for treating a catalyst discharged from bubbling bed hydrogenation of residual oil, comprising adjustment and control to reduce the viscosity, desorption and separation by rotational flow, and separation and resource utilization of the three phase oil-water-catalyst. In particular, the process comprises the following steps:

introducing the catalyst discharged intermittently from the bubbling bed hydrogenation of residual oil into a stirring and adjusting tank for storage and buffering, and controlling continuous effluence of the material to ensure continuous treatment of the discharged catalyst;

introducing the discharged catalyst under continuous, controllable effluence into a stirring and dispersing tank for controlling the temperature of the system by adding circulating hot water to reduce the viscosity of the oil adsorbed on the surfaces and inside the pores of the discharged catalyst particles and improve the flowability of the adsorbed oil;

introducing the discharged catalyst, of which the temperature is controlled by circulating hot water, into a rotational flow desorber to realize desorption and separation of the adsorbed oil on the surfaces and inside the pores of the discharged catalyst particles by a flowing shear force in the rotational flow field;

introducing the oil/water mixture produced in the desorption and separation by rotational flow into a circulating hot water storage tank to achieve oil-water separation and recovery of oil; pumping the hot water through a circulating hot water pump for recycling; subjecting the catalyst particles/water mixture produced in the desorption and separation by rotational flow to two-stage dewatering in reducing amount by concentration in a concentrator and drying in a dryer to recover the catalyst particles, wherein the water obtained in the dewatering process may also be recycled to the circulating hot water storage tank for circulating use.

According to the invention, the catalyst discharged from the bubbling bed hydrogenation of residual oil has an oil content of 20-60 wt % based on the weight of the catalyst; and the fresh support has a specific surface area of 183.071-416.308 $m^2/g$ determined using BJH method (a method for measuring specific surface area) and a pore volume of 0.22-0.71 ml/g.

According to the invention, the ratio of the discharged catalyst to the circulating water in the stirring and dispersing tank is 1:5 to 1:100 (by weight); the operating temperature is 50-190° C.; the operating pressure is 0-1.3 MPa (gauge); and the dispersing time is 1-120 minutes.

According to the invention, in the rotational flow desorber, the shear rate is 3000-10000 $s^{-1}$; the operating pressure is not greater than 0.15 MPa; the separating efficiency of the solid catalyst particles is not lower than 98%; the flow rate at the catalyst particle enriched phase outlet is 5-25% of that at the inlet; the oil content of the discharged catalyst (dried) after the desorption and separation by rotational flow is reduced to below 13.5 wt %.

According to the invention, the separating efficiency of the catalyst particles by the rotational flow concentrator is not lower than 98%, and the operating pressure is not greater than 0.15 MPa.

The process of the invention is suitable for treating not only a catalyst discharged from bubbling bed hydrogenation of residual oil, but also various oil-containing solid waste produced in oil fields, refineries, etc.

In a second aspect of the invention, there is provided a device for treating a catalyst discharged from bubbling bed hydrogenation of residual oil, comprising:

a stirring and adjusting tank for adjusting and storing the catalyst discharged intermittently from the bubbling bed hydrogenation of residual oil, and controlling continuous effluence of the material in order to guarantee continuous treatment of the discharged catalyst;

a stirring and dispersing tank connected to the outlet of the stirring and adjusting tank for adjusting the discharged catalyst to a suitable temperature by adding water to reduce the viscosity of the oil adsorbed on the surfaces and inside the pores of the discharged catalyst particles and improve the flowability of the adsorbed oil;

a rotational flow desorber connected to the outlet of the stirring and dispersing tank for forming a stable rotational flow field in the rotational flow desorber with the mixture of the discharged catalyst and the hot water, wherein the adsorbed oil is desorbed and separated from the surfaces and inner pores of the discharged catalyst particles with the aid of a flowing shear force in the rotational flow field;

a circulating hot water storage tank connected to the oil/water mixture outlet of the rotational flow desorber for effecting oil-water separation; a circulating hot water pump connected to the outlet of the circulating hot water storage tank for pumping the circulating hot water into the stirring and dispersing tank for circulating use; a rotational flow concentrator connected to the catalyst particle enriched phase outlet of the rotational flow desorber for dewatering the catalyst/water mixture by concentration after desorption and separation by rotational flow; and a dryer connected to the catalyst particle enriched phase outlet of the rotational flow concentrator for dewatering the catalyst/water mixture finally by drying to achieve the recovery of the solid catalyst particles.

According to the invention, the stirring and adjusting tank adopts a stirring structure to prevent sedimentation and hardening due to longtime storage of the discharged catalyst.

According to the invention, the stirring and dispersing tank is selected from a stirring and dispersing device to ensure homogeneous temperature control over the system by means of stirring and dispersion.

According to the invention, the rotational flow desorber uses a flowing shear force in a stable rotational flow field formed therein with the discharged catalyst/water mixture to achieve desorption and separation of the adsorbed oil from the surfaces and inner pores of the discharged catalyst particles.

According to the invention, the rotational flow concentrator is selected from a hydraulic cyclone; the circulating hot water storage tank is selected from an oil-water separating device; the circulating hot water pump is selected from a chemical process pump; and the dryer is selected from an inner backfeed dryer.

The device of the invention is suitable for treating not only a catalyst discharged from bubbling bed hydrogenation of residual oil, but also various oil-containing solid waste produced in oil fields, refineries, etc.

The invention will be illustrated in detail with reference to the accompanying drawing, for which the object and features of the invention will become more apparent, wherein:

FIG. 1 is a flow chart of treating a catalyst discharged from a bubbling bed for residual oil according to one embodiment of the invention. As shown in FIG. 1, a discharged catalyst is discharged intermittently into a stirring and adjusting tank 1 (hermetically sealed with a seal gas) from a bubbling bed hydrogenation reactor for residual oil; after adjusted and buffered in the stirring and adjusting tank, the material is discharged continuously under control to guarantee continuous treatment of the discharged catalyst; the discharged catalyst flowing out continuously and controllably enters a stirring and dispersing tank 2 (hermetically sealed with a seal gas); at the same time, circulating hot water is pumped by a circulating hot water pump 6 to the stirring and dispersing tank 2 from a circulating hot water storage tank 5; the system is adjusted to a suitable temperature by the process of adding the circulating hot water, so as to reduce the viscosity of the oil adsorbed on the surfaces and inside the pores of the discharged catalyst particles and improve the flowability of the adsorbed oil; the discharged catalyst whose temperature is controlled by the circulating hot water enters a rotational flow desorber 3, wherein desorption and separation of the oil on the surfaces and inside the pores of the discharged catalyst particles is realized with the aid of a flowing shear force in a rotational flow field; an oil/water mixture produced in the rotational flow desorber 3 leaves the oil/water mixture outlet at the upper part of the rotational flow desorber 3 and enters the circulating hot water storage tank 5 to fulfill oil-water separation and thus realize recovery of the oil; a catalyst particles/water mixture produced in the rotational flow desorber 3 leaves the catalyst particle enriched phase outlet at the lower part of the rotational flow desorber 3 and enters a rotational flow concentrator 4 to reduce the amount of water by means of dewatering using rotational flow concentration; after the rotational flow concentration, the dewatered catalyst particles/water mixture is discharged from the catalyst particle concentrated phase outlet at the lower part of the rotational flow concentrator 4 to a dryer 7 for dewatering by drying, so as to realize the recovery of the catalyst particles; the water obtained by dewatering in the rotational flow concentrator 4 and the condensed water obtained by condensing the drying tail gas from the dryer 7 using a condenser 8 may also be recycled to the circulating hot water storage tank 5 for circulating use; and, the circulating hot water storage tank 5 may be supplemented with water from outside.

The main advantages of the invention include:

(1) continuous treatment of the discharged catalyst is realized because the catalyst discharged intermittently from bubbling bed hydrogenation of residual oil is discharged continuously after adjustment and storage;

(2) as the discharged catalyst is adjusted to a suitable temperature by adding water to reduce the viscosity of the oil adsorbed on the surfaces and inside the pores of the discharged catalyst particles and improve the flowability of the adsorbed oil, and then a flowing shear force in a rotational flow field is used to desorb and separate the adsorbed oil from the surfaces and inner pores of the solid particles, the whole treatment process is carried out under mechanical action, showing the advantages of simple flow, high deoiling efficiency, low running cost and good operability; and no reagents are used, avoiding secondary pollution and additional expense for using reagents; and (3) the hot water in the invention can be recycled for circulating use, and the solid catalyst particles can also be recovered in reduced amount.

EXAMPLES

The invention will be further illustrated with reference to the following specific Examples. However, it is to be appreciated that these examples are only intended to demonstrate the invention without limiting the scope of the invention. The test methods in the following examples for which no specific conditions are indicated will be carried out generally under conventional conditions or under those conditions suggested by the manufacturers. All percentages and parts are based on weight unless otherwise specified.

Example 1

For a bubbling bed residual oil hydrogenation unit of 50000 tons/year, the catalyst discharged from the bubbling bed hydrogenation of residual oil was treated according to the process of the invention. The specific operation and effects are described as follows.

1. Properties of the Discharged Catalyst

In the on-line discharge of the discharged catalyst, the total amount of discharge per week was 4 tons, in which 2.4 ton oil was contained.

The fresh catalyst support was in the form of microspherical particles having a particle diameter of 0.4-0.5 mm, a BJH specific surface area of 416.308 m$^2$/g, a pore volume of 0.71 ml/g and a 50% pore size distribution of less than 7 nm.

The petroleum type pollutants adsorbed on the surfaces and inside the pores of the discharged catalyst particles were mainly substances residing in the distillation range of diesel, possibly comprising a minor amount of paraffin wax.

2. Procedure

The procedure was carried out according to the process of the invention, specifically comprising:

(A) the catalyst discharged intermittently from the bubbling bed hydrogenation of residual oil was introduced into a stirring and adjusting tank 1 for storage and buffering (totaling 4 tons per week), and the continuous discharge rate was controlled at 0.024 ton/h to guarantee continuous treatment of the discharged catalyst;

(B) the discharged catalyst flowing out continuously was introduced into a stirring and dispersing tank 2, wherein water was added at 1:40 (discharged catalyst: water) and the temperature of the system was controlled at 95° C., wherein the discharged catalyst/hot water mixture was held in the stirring and dispersing tank 2 under stirring for 60 minutes to guarantee homogeneous temperature under control;

(C) the discharged catalyst/hot water mixture having a temperature of 95° C. was introduced into a rotational flow desorber 3 at a tangent velocity of 12 m/s, wherein desorption and separation of the adsorbed oil on the surfaces and inside the pores of the discharged catalyst particles was realized with the aid of a flowing shear force in a rotational flow filed; and (D) the oil-containing hot water produced in the desorption and separation by rotational flow was introduced into a circulating hot water storage tank 5 to achieve oil-water separation and recovery of oil; the hot water was pumped through a circulating hot water pump 6 for recycling; and the catalyst particles/water mixture produced in the desorption and separation by rotational flow was subjected to two-stage dewatering in reducing amount by concentration in a concentrator 4 and drying in a dryer 7 to recover the catalyst particles, wherein the water obtained in the dewatering process might also be recycled to the circulating hot water storage tank 5 for circulating use.

3. Analysis on the Results

For the immediate catalyst which was discharged from the bubbling bed hydrogenation of residual oil and amounted to 4 tons per week (containing 2.4 ton oil), after treated according to the process of the invention, the oil content was decreased to below 13.5%, and 2.12 ton oil could be recovered per week, wherein the recovery rate of oil was up to 88%. Noticeably in particular, the pore volume of the support of the catalyst discharged from the bubbling bed hydrogenation of residual oil was 0.71 ml/g, and 0.52 ton oil/ton catalyst (mass of the skeleton) was adsorbed in the pores of the catalyst during discharge. After treatment, 75% of the oil adsorbed in the pores could be recovered.

A majority of the substances in the recovered oil reside in the distillation range of diesel. If the diesel price is assumed to be 7775 Yuan/ton, and the discharged catalyst is assumed to be treated in an amount of 192 tons per year (containing 114 ton oil), 101 ton oil will be recovered in total, equivalent to saving oil expense of 790 thousand Yuan per year. In addition, this will make contribution to environmental protection.

All of the documents mentioned in the invention are incorporated herein by reference, as if each of them were incorporated herein individually by reference. It is to be further understood that various changes or modifications can be made by those skilled in the art after reading the above teachings of the invention, and these equivalent variations fall in the scope defined by the accompanied claims of the application as well.

The invention claimed is:

1. A device for treating a discharged catalyst, comprising:
   a stirring and adjusting tank (1) for adjusting and storing a discharged catalyst, wherein the catalyst is discharged intermittently from a bubbling bed and comprises absorbed oil;
   a stirring and dispersing tank (2) connected to an outlet of the stirring and adjusting tank (1) for adjusting a temperature of the discharged catalyst by adding water to reduce a viscosity of the adsorbed oil and improve a flowability of the adsorbed oil;
   a rotational flow desorber (3) connected to an outlet of the stirring and dispersing tank (2) for forming a rotational flow field therein with a discharged catalyst/water mixture, wherein the adsorbed oil is desorbed and separated by rotational flow from the discharged catalyst by a flowing shear force in the rotational flow field;
   a circulating hot water storage tank (5) connected to an outlet for the oil/water mixture of the rotational flow desorber (3) for effecting oil-water separation;
   a circulating hot water pump (6) connected to an outlet of the circulating hot water storage tank (5) for pumping circulating hot water into the stirring and dispersing tank (2) for recycle;
   a rotational flow condenser (4) connected to a catalyst particle enriched phase outlet of the rotational flow desorber (3) for dewatering the catalyst/water mixture by concentration after desorption and separation by rotational flow; and
   a dryer (7) connected to the catalyst particle enriched phase outlet of the rotational flow condenser (4) for final dewatering of the catalyst/water mixture by drying to achieve recovery of solid catalyst particles.

2. The device of claim 1, wherein a ratio by weight of the discharged catalyst to the circulating water in the stirring and dispersing tank (2) is 1:5 to 1:100; and the stirring and dispersing tank (2) has an operating temperature of 50-190° C., an operating gauge pressure of 0-1.3 MPa and a dispersing time of 1-120 minutes.

3. Use of the device of claim 2 in treatment of discharged catalyst in an oil-containing solid waste.

4. The device of claim 1, wherein in the rotational flow desorber (3), shear rate is 3000-10000 s$^{-1}$; operating pressure is not greater than 0.15 MPa; separating efficiency of the catalyst particles is not lower than 98%; flow rate at the catalyst particle enriched phase outlet is 5-25% of that at the inlet; oil content of the discharged catalyst after desorption and separation by rotational flow is reduced to below 13.5 wt % after drying based on the weight of the discharged catalyst.

5. Use of the device of claim 4 in treatment of discharged catalyst in an oil-containing solid waste.

6. The device of claim 1, wherein separating efficiency of the catalyst particles by the rotational flow concentrator (4) is not lower than 98%, and operating pressure is not greater than 0.15 MPa.

7. Use of the device of claim 6 in treatment of discharged catalyst in an oil-containing solid waste.

8. The device of claim 1, wherein the rotational flow concentrator (4) is selected from a hydraulic cyclone; the circulating hot water storage tank (5) is selected from an oil-water separating device; the circulating hot water pump (6) is selected from a chemical engineering process pump; and the dryer (7) is selected from an inner backfeed dryer.

9. Use of the device of claim 8 in treatment of discharged catalyst in an oil-containing solid waste.

10. The device of claim 1, wherein the stirring and adjusting tank (1) adopts a stirring structure to prevent sedimentation and hardening due to longtime storage of the discharged catalyst; and the stirring and dispersing tank (2) is selected from a stirring and dispersing device to ensure homogeneous temperature control by means of stirring and dispersion.

11. Use of the device of claim 10 in treatment of discharged catalyst in an oil-containing solid waste.

12. Use of the device of claim 1 in treatment of discharged catalyst in an oil-containing solid waste.

* * * * *